(12) United States Patent
Lai et al.

(10) Patent No.: US 9,680,760 B2
(45) Date of Patent: Jun. 13, 2017

(54) ADAPTIVE MARKING FOR WRED WITH INTRA-FLOW PACKET PRIORITIES IN NETWORK QUEUES

(71) Applicant: Cisco Technology, Inc., San Jose, CA (US)

(72) Inventors: Cheng-Jia Lai, San Jose, CA (US); Wenyi Wang, Cupertino, CA (US); Shih-cheng Stan Yang, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 434 days.

(21) Appl. No.: 13/943,018

(22) Filed: Jul. 16, 2013

(65) Prior Publication Data

US 2015/0023366 A1    Jan. 22, 2015

(51) Int. Cl.
*H04L 12/863* (2013.01)
*H04L 12/853* (2013.01)
*H04L 12/851* (2013.01)
*H04L 12/823* (2013.01)
*H04N 21/647* (2011.01)

(52) U.S. Cl.
CPC ...... *H04L 47/6215* (2013.01); *H04L 47/2416* (2013.01); *H04L 47/2433* (2013.01); *H04L 47/32* (2013.01); *H04N 21/64792* (2013.01)

(58) Field of Classification Search
CPC ............. H04L 47/6215; H04L 47/2416; H04L 47/2433; H04L 47/32; H04N 21/64792
See application file for complete search history.

(56) References Cited

U.S. PATENT DOCUMENTS

| | | | |
|---|---|---|---|
| 5,500,899 A | * | 3/1996 | Snow ...................... H04L 9/065 380/260 |
| 6,188,698 B1 | | 2/2001 | Galand et al. |
| 6,320,845 B1 | | 11/2001 | Davie |

(Continued)

FOREIGN PATENT DOCUMENTS

| | | | | |
|---|---|---|---|---|
| WO | WO 03103238 | * | 12/2003 | ......... H04L 12/5693 |
| WO | WO 03103238 A1 | * | 12/2003 | ......... H04L 12/5693 |

OTHER PUBLICATIONS

Title, Providing Fairness in Diffserv Architecture created by Sungwon Yi, Xidong Deng, George Kesidis, and Chita R. Das Department of Computer Science & Engineering the Pennsylvania State University, University Park, PA 16802.*

(Continued)

*Primary Examiner* — Andrew Lai
*Assistant Examiner* — Hoyet H Andrews, III
(74) *Attorney, Agent, or Firm* — Parker Ibrahim & Berg LLC; James M. Behmke; Stephen D. LeBarron

(57) ABSTRACT

In one embodiment, a router receives a packet, and determines an intra-flow packet priority level of the packet. The router may then map the intra-flow packet priority level to a weighted random early detection (WRED) marking based on running statistics of intra-flow packet priority levels across received flows, and marks the packet with the mapped WRED marking. By placing the marked packet into an outgoing network queue for transmission, the router may then forward or drop the marked packet based on the network queue, accordingly.

20 Claims, 7 Drawing Sheets

NORMALIZATION IN ADAPTIVE MARKING

(56) References Cited

U.S. PATENT DOCUMENTS

| | | | |
|---|---|---|---|
| 6,389,468 B1* | 5/2002 | Muller | H04L 67/1002 709/226 |
| 6,463,068 B1 | 10/2002 | Lin et al. | |
| 6,546,017 B1 | 4/2003 | Khaunte | |
| 6,567,861 B1* | 5/2003 | Kasichainula | G06F 9/548 709/246 |
| 6,621,791 B1 | 9/2003 | Davie | |
| 6,798,743 B1 | 9/2004 | Ma et al. | |
| 6,813,243 B1 | 11/2004 | Epps et al. | |
| 7,065,779 B1* | 6/2006 | Crocker | H04N 21/242 725/111 |
| 7,106,731 B1 | 9/2006 | Lin et al. | |
| 7,139,281 B1* | 11/2006 | Bodin | H04L 47/10 370/252 |
| 7,349,336 B2* | 3/2008 | Mathews | H04L 12/5693 370/230 |
| 7,554,907 B1 | 6/2009 | Epps et al. | |
| 7,586,918 B2 | 9/2009 | Levy et al. | |
| 7,606,158 B2 | 10/2009 | Fedorkow et al. | |
| 7,711,844 B2* | 5/2010 | Schuehler | H04L 43/18 709/223 |
| 7,725,919 B1 | 5/2010 | Thiagarajan | H04N 5/76 725/101 |
| 7,835,293 B2 | 11/2010 | Cidon et al. | |
| 7,869,428 B2* | 1/2011 | Shake | H04L 1/08 370/389 |
| 7,917,648 B2* | 3/2011 | Wu | H04L 12/5693 370/235 |
| 8,005,012 B1* | 8/2011 | Aybay | H04L 43/02 370/232 |
| 8,027,305 B1* | 9/2011 | Rogers | H04W 48/20 370/331 |
| 8,046,479 B2* | 10/2011 | Einarsson | H04N 7/17318 709/217 |
| 8,085,775 B1* | 12/2011 | Pappu | H04L 47/2441 370/392 |
| 8,194,545 B2* | 6/2012 | Monzawa | H04L 47/10 370/232 |
| 8,238,241 B2* | 8/2012 | Samuels | H04L 12/24 370/230.1 |
| 8,238,246 B2* | 8/2012 | Ferguson | H04L 45/00 370/235 |
| 8,310,934 B2* | 11/2012 | Hou | H04L 47/266 370/235 |
| 8,718,131 B2* | 5/2014 | Park | H04L 47/10 375/240.01 |
| 8,850,590 B2* | 9/2014 | Kellerman | H04L 9/3247 380/260 |
| 8,867,529 B2* | 10/2014 | Pearce | H04L 47/52 370/328 |
| 2002/0107908 A1* | 8/2002 | Dharanikota | H04L 41/5003 709/203 |
| 2003/0115480 A1* | 6/2003 | McDysan | H04L 63/0272 726/36 |
| 2003/0188252 A1* | 10/2003 | Kim | H04L 1/0046 714/779 |
| 2004/0030745 A1* | 2/2004 | Boucher | H04L 12/5693 709/203 |
| 2004/0141530 A1* | 7/2004 | Spio | H04B 7/18543 370/535 |
| 2005/0094726 A1* | 5/2005 | Park | H04N 21/234327 375/240.08 |
| 2007/0006293 A1* | 1/2007 | Balakrishnan | H04L 63/0245 726/13 |
| 2007/0070907 A1* | 3/2007 | Kumar | H04L 47/10 370/235 |
| 2007/0121615 A1* | 5/2007 | Weill | H04L 12/4633 370/389 |
| 2008/0013542 A1* | 1/2008 | Youm | H04N 21/235 370/395.3 |
| 2008/0056153 A1* | 3/2008 | Liu | H04L 12/2602 370/252 |
| 2008/0080382 A1* | 4/2008 | Dahshan | H04L 12/5693 370/235 |
| 2008/0201733 A1* | 8/2008 | Ertugrul | G06F 17/30867 725/32 |
| 2009/0022134 A1* | 1/2009 | Chun | H04W 28/06 370/342 |
| 2009/0241170 A1* | 9/2009 | Kumar | H04L 47/10 726/3 |
| 2009/0287807 A1* | 11/2009 | Sueyoshi | G06F 9/54 709/223 |
| 2010/0043068 A1* | 2/2010 | Varadhan | H04L 12/4633 726/15 |
| 2010/0088756 A1* | 4/2010 | Balakrishnan | H04L 63/0245 726/13 |
| 2010/0103837 A1* | 4/2010 | Jungck | H04L 29/12066 370/252 |
| 2011/0022721 A1* | 1/2011 | Diab | H04L 69/08 709/233 |
| 2011/0110382 A1* | 5/2011 | Jabr | H04L 47/125 370/422 |
| 2011/0113218 A1* | 5/2011 | Lee | G06F 9/46 712/18 |
| 2011/0158146 A1* | 6/2011 | Poola | H04L 12/189 370/312 |
| 2011/0216774 A1* | 9/2011 | Nevil | H04L 12/56 370/395.7 |
| 2011/0255408 A1* | 10/2011 | Aybay | H04L 43/02 370/235 |
| 2011/0295983 A1* | 12/2011 | Medved | H04L 45/00 709/220 |
| 2011/0317557 A1* | 12/2011 | Siddam | H04W 28/16 370/232 |
| 2012/0014282 A1* | 1/2012 | Pappu | H04L 47/2441 370/253 |

OTHER PUBLICATIONS

J. Shin, JongWon Kim, D. C. Lee and C. C. J. Kuo, "Adaptive packet forwarding for relative differentiated services and categorized packet video," Communications, 2001. ICC 2001. IEEE International Conference on, Helsinki, 2001, pp. 763-767 vol. 3. doi: 10.1109/ICC.2001.937342.*

Jitae Shin et al., titled "Quality of Service Mapping Mechanism for Packet Video in Differentiated Services Network" (SHIN hereinafter) was presented in part at Packet Video Workshop 2000, Sardinia Italy, May 2000.*

\* cited by examiner

US 9,680,760 B2

ADAPTIVE MARKING FOR WRED WITH INTRA-FLOW PACKET PRIORITIES IN NETWORK QUEUES

TECHNICAL FIELD

The present disclosure relates generally to computer networks, and, more particularly, to packet marking for weighted random early detection (WRED).

BACKGROUND

Video streams are typically encoded in compression with packetization when transmitted over packet-switched networks such as the Internet, enterprise virtual private networks (VPNs), and service provider Internet Protocol Television (IPTV) networks. Video codec specifications such as ITU-T H.264 and H.263 define the packet formats to carry the encoded video data in slices, where the payload headers contain the slice types of video data in the payloads. Thus, network devices in the middle may be able to distinguish the more important packets from the less important by packet markings or deep packet inspection (DPI) when packet drops are needed in a network queue upon congestion or for congestion avoidance.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
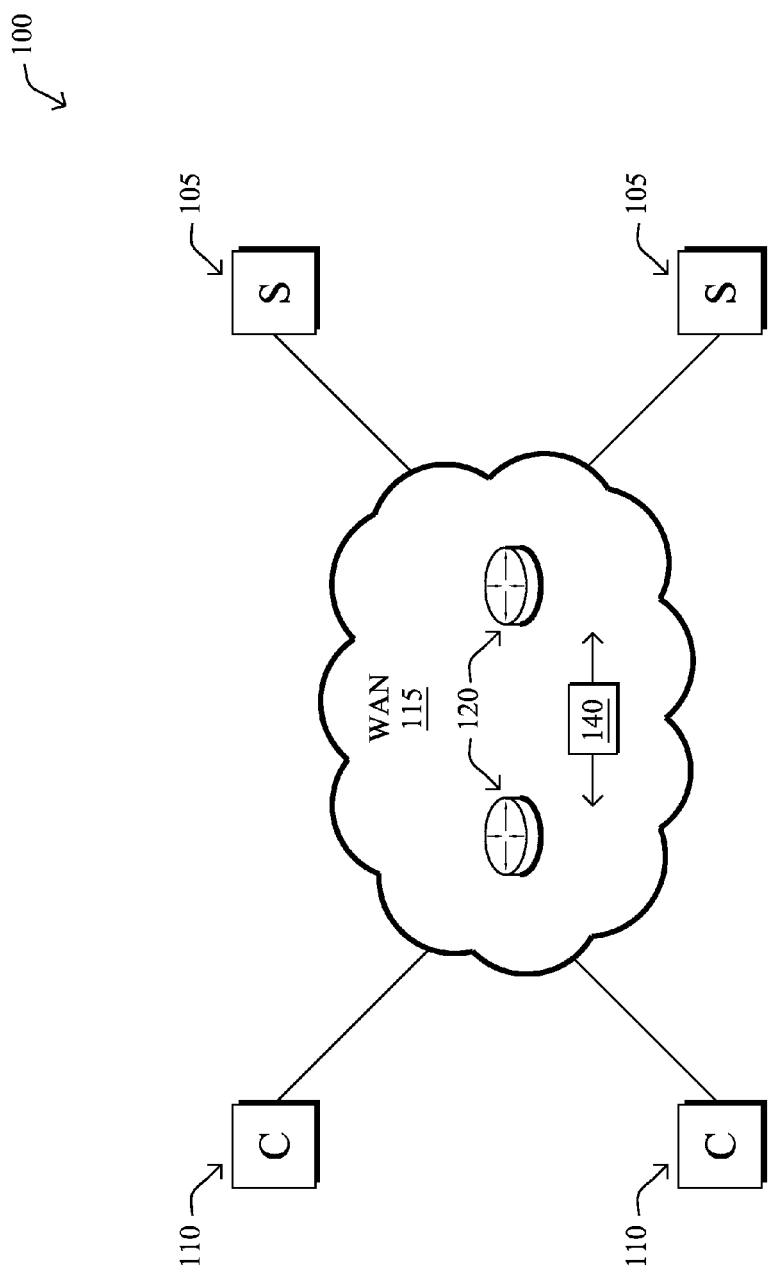
FIG. 1 illustrates an example communication network.

According to one or more embodiments of the disclosure, a router receives a packet, and determines an intra-flow packet priority level of the packet. The router may then map the intra-flow packet priority level to a weighted random early detection (WRED) marking based on running statistics of intra-flow packet priority levels across received flows, and marks the packet with the mapped WRED marking. By placing the marked packet into an outgoing network queue for transmission, the router may then forward or drop the marked packet based on the network queue, accordingly.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP) or more particularly the User Datagram Protocol (UDP) or Real-time Transport Protocol (RTP) (which defines a standardized packet format for delivering audio and video over IP networks). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain."

FIG. 1 is a schematic block diagram of an example computer network 100 illustratively comprising various interconnected network devices (e.g., servers, routers, etc.) which may form local networks that are interconnected by a global network (e.g., the public Internet) or WAN 115, as shown. Illustratively, various client devices ("C") 110 and various servers ("S") 105 may be interconnected via the WAN 115 (and/or within respective local networks), which may comprise a plurality of routers 120. Those skilled in the art will understand that any number of network devices may be implemented in the computer network 100, that the network devices may be interconnected with one another in any suitable configuration, and that the view shown herein is for simplicity.

Data packets 140 may be exchanged among the network devices of the computer network 100 over links using predefined network communication protocols such as certain known wired protocols, wireless protocols, or other protocols where appropriate. In this context, a protocol consists of a set of rules defining how the devices interact with each other.

Figure 2:
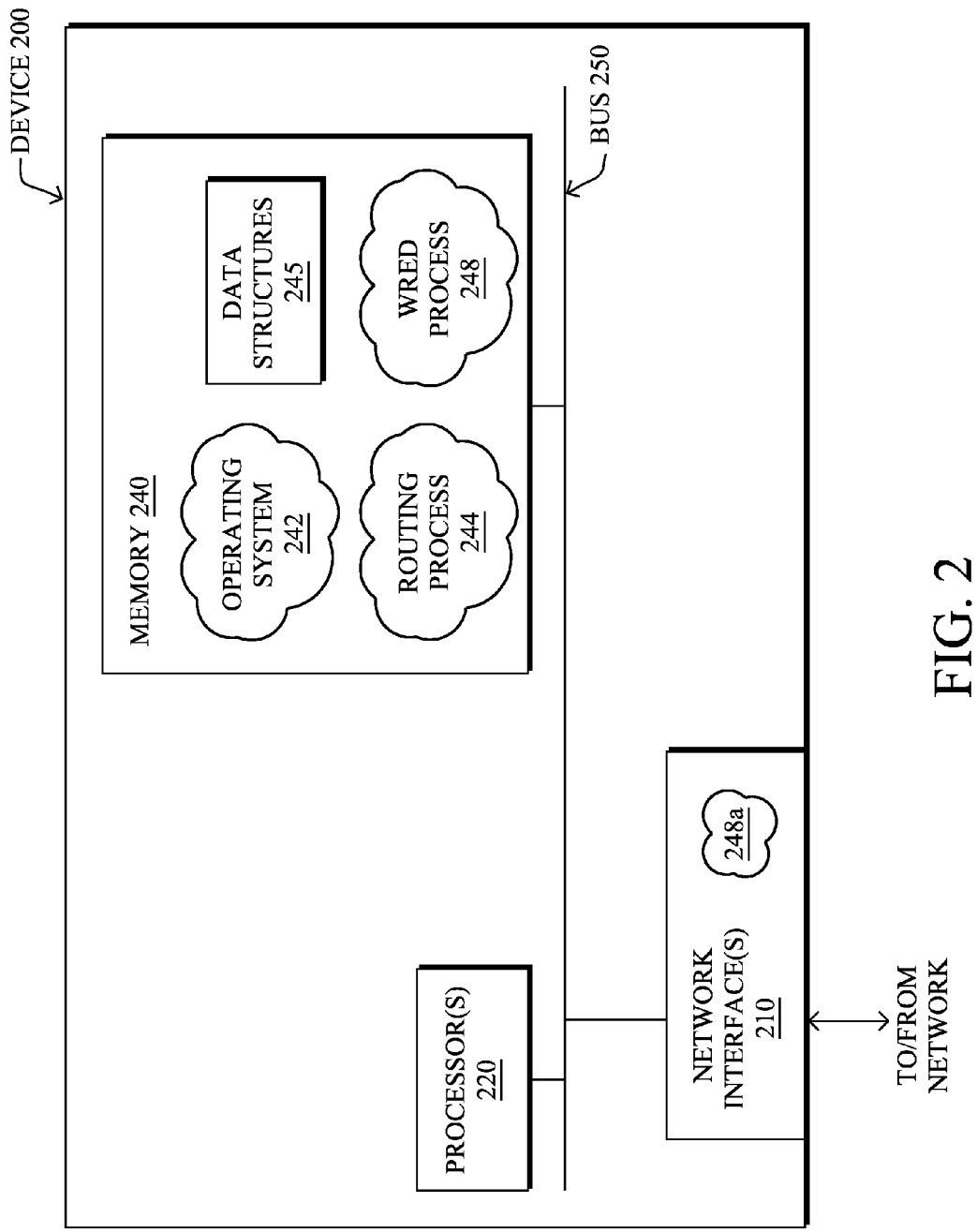
FIG. 2 illustrates an example network device/node.

FIG. 2 is a schematic block diagram of an example device 200 that may be used with one or more embodiments described herein, e.g., such as any of the routers 120 or other devices as shown in FIG. 1 above. The device may comprise one or more network interfaces 210, one or more processors 220, and a memory 240 interconnected by a system bus 250. The network interface(s) 210 contain the mechanical, electrical, and signaling circuitry for communicating data over links coupled to the network 100. The network interfaces may be configured to transmit and/or receive data using a variety of different communication protocols, including, inter alia, TCP, RTP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for Virtual Private Network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor(s), functionally organizes the device by, inter alia, invoking operations in support of software processes and/or services executing on the device. These software processes and/or services may comprise routing process/services 244 and an illustrative weighted random early detection (WRED) process 248, as described herein, which may alternatively be located within individual network interfaces (e.g., process 248a).

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process/services 244 contain computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database (not shown) containing, e.g., data used to make forwarding decisions. In particular, changes in the network topology may be communicated among routers 200 using routing protocols, such as the conventional OSPF and IS-IS link-state protocols (e.g., to "converge" to an identical view of the network topology). Notably, routing services 244 may also perform functions related to virtual routing protocols, such as maintaining VRF instances (not shown), or tunneling protocols, such as for Multi-Protocol Label Switching (MPLS), generalized MPLS (GMPLS), etc., each as will be understood by those skilled in the art.

As noted above, video streams are typically encoded in compression with packetization when transmitted over packet-switched networks such as the Internet, enterprise virtual private networks (VPNs), and service provider Internet Protocol Television (IPTV) networks. Video codec specifications such as ITU-T H.264 and H.263 define the packet formats to carry the encoded video data in slices, where the payload headers contain the slice types of video data in the payloads. Thus, network devices in the middle may be able to distinguish the more important packets from the less important by packet markings or deep packet inspection (DPI) when packet drops are needed in a network queue upon congestion or for congestion avoidance.

However, those packet priority levels are seen not only inter-flow but also intra-flow for video, that is, inside the same flow, packets may have multiple priority levels. For example, H.264 Network Abstraction Layer (NAL) unit header contains fields that can show which type of video data is carried in this packet, such as instantaneous decode refresh (IDR), sequence parameters, referenced P, non-referenced P, non-referenced B, etc. Depending on which type, intra-flow priorities can be decided in a predefined order according to how strong of an impact it is to the video quality if the very packet is discarded. Those intra-flow priorities should only be compared within the same flow, i.e. presenting a local order in a flow, instead of a global order between flows. Thus, the intra-flow priorities are unlike the inter-flow priorities such as differentiated services code point (DSCP) and IP Precedence, and will require special handling in network queues.

In fact, new technologies have recently been proposed to improve video flow quality of service (QoS) by protecting those video packets that are more important for decoding so that they should not be dropped unless the less-important packets are already dropped. For example, there are existing initiatives in media frame protection (MFP) for video flows at network congestion. Some of those mechanisms rely on the existing Differentiated Services (DiffServ) model by packet classification and weighted random early detection (WRED) where the more important video packets are marked to receive a lower packet drop rate and/or setting a higher threshold before starting random drops. Those markings are put in either the packet headers (e.g., DSCP and IP Precedence) or internal metadata of a packet in the network device (e.g. qos-group and discard-class). Then, the active queue management (AQM) of the network queue can base on those markings to run WRED. In the congestion avoidance stage, those mechanisms may also be combined with the markings of Explicit Congestion Notification (ECN) or Pre-Congestion Notification (PCN) bits in packet headers for adaptive endpoints.

Unfortunately, the existing marking mechanisms for WRED cannot correctly handle the intra-flow priorities (IFP). If the intra-flow priorities are simply mapped to the marking values for inter-flow without special handling, it may result in unfair bandwidth sharing among video flows. This is because the video flows are very likely to be generated from different encoders in different video contents, such that each individual video flow has a different distribution of intra-flow priorities, in terms of how many packets per intra-flow priority level. Thus, when simply mapped (say, linearly or by table lookup) to the markings for WRED, those flows may see different per-flow packet drop rates simply due to their own intra-flow priority distributions, which is not fair. Instead, to achieve fairness, those flows should see equal per-flow packet drop rates and thresholds, while they see different packet drop rates and thresholds only among packets inside the same flow, i.e. due to the intra-flow priorities.

Said differently, if WRED is configured to protect more important video packets by IFP markings as weights for packet-drop rates and thresholds, it can be unfair among different flows in the same queue. For instance, the following examples may occur:

Flows with all I-frames→all important, so all protected;
Flows with extra SVC layers→too humble, so suffer;
Flows with different contents→various ratio of I/P/B packets;
Flow with an adaptive bit rate→constantly changing.

As such, the techniques described below "normalize" intra-flow priority markings for WRED in a manner that is adaptive to each flow's traffic characteristics, and that allows comparison of intra-flow priorities of packets across flows.

As one example of unfairness, suppose flow A generates 10% IDR slices and 90% P slices while flow B generates 25% IDR slices and 75% P slices. If the network queue with WRED is configured to protect traffic class of IDR slices (regardless of flows) against P slices, the result is likely that flow B consumes more bandwidth over flow A on congestion. This is unfair. Instead, to be fair, flow A and B should be able to share the bandwidth equally (or with some weights if somehow configured). Then within flow A the packet drops are only on packets of P slices while the same within flow B. It means that the intra-flow priorities of packets should not affect the bandwidth sharing by packets between flows, but only the bandwidth sharing by packets within the same flow.

Figure 3:
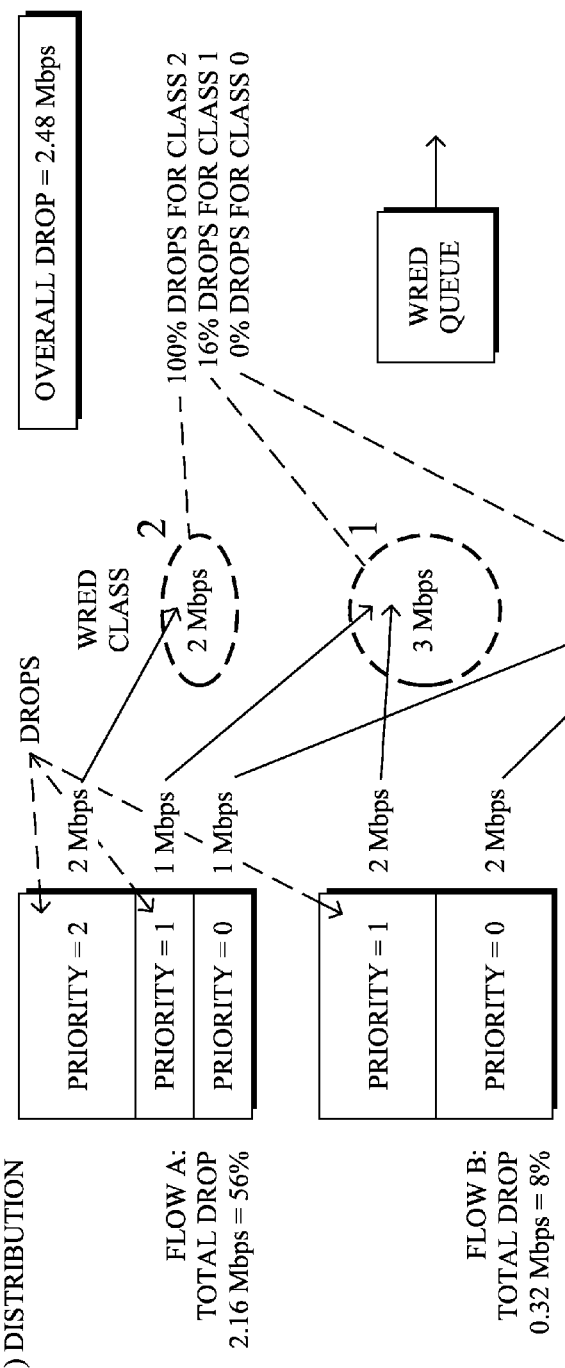
FIG. 3 illustrates an example of an unfairness problem in weighted random early detection (WRED) with intra-flow priority (IFP) marking.
Figure 3:
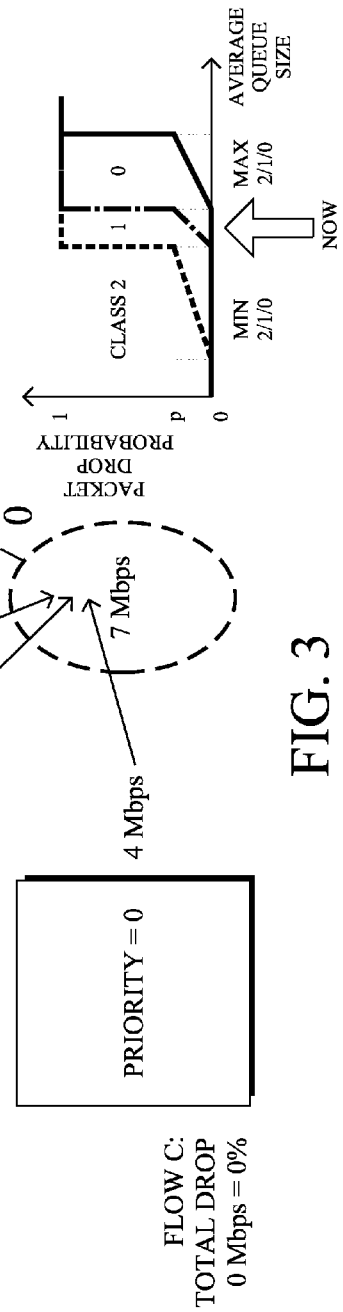

As another example, visually (and for comparison below), FIG. 3 illustrates an example of an unfairness problem in WRED with intra-flow priority (IFP) marking between three flows, A, B, and C. In particular, assume that flow A has 2 Mbps of data at priority "2", and 1 Mbps each at priority "1" and "0". Also, flow B has 2 Mbps at each of priorities 1 and 0, while flow C has all 4 Mbps at priority 0. Assuming an overall drop rate of 2.48 Mbps, all of the WRED class 2 (priority 2) packets are dropped, and 16% of the class 1 packets are dropped. In this instance, flow A suffers greatly (54% drops), while flows B and C remain relatively untouched (8% and 0% drops, respectively).

The adaptive marking techniques herein, on the other hand, provide fairness of bandwidth sharing in network queues while addressing the intra-flow priorities among packets that are typically seen in video flows with modern codec technologies. Notably, the techniques herein may be applied to any type of data flow, and are not limited to video flows (used merely as one example of data flows with intra-flow priorities). The techniques herein can be used together with the existing WRED in the DiffServ model, but may use running statistics to normalize the mapping from intra-flow priorities to the marking values that will be used in WRED.

Specifically, according to one or more embodiments of the disclosure as described in detail below, when a router receives a packet, it determines an intra-flow packet priority level of the packet. The router may then map the intra-flow packet priority level to a weighted random early detection (WRED) marking based on running statistics of intra-flow packet priority levels across received flows, and marks the packet with the mapped WRED marking. By placing the marked packet into an outgoing network queue for transmission, the router may then forward or drop the marked packet based on the network queue, accordingly.

Illustratively, the techniques described herein may be performed by hardware, software, and/or firmware, such as in accordance with the WRED process 248/248a, which may contain computer executable instructions executed by the processor 220 (or independent processor of interfaces 210) to perform functions relating to the techniques described herein. For example, the techniques herein may be treated as extensions to conventional packet marking protocols (e.g., WRED, DiffServ, etc.), and as such, may be processed by similar components understood in the art that execute those protocols, accordingly.

Figure 4:
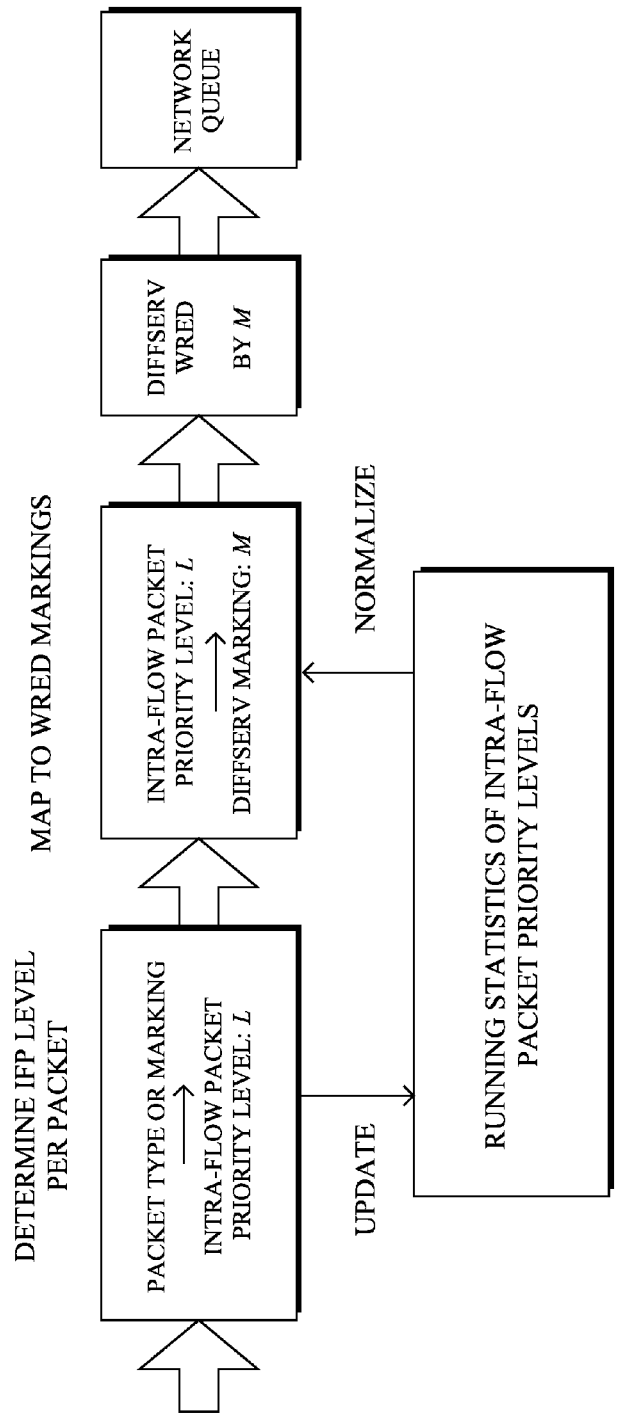
FIG. 4 illustrates an example of adaptive marking by IFP statistics.

Operationally, FIG. 4 illustrates an example of adaptive marking by IFP statistics. In particular, upon receiving a packet 140, a router 120 may determine the intra-flow packet priority level "L" based on a packet type or marking. The received levels L may be used to update a running statistic of intra-flow packet priority levels, such that the general solution for optimization is based on the statistics of all L samples known in the past. Note that although this may not fully optimize the future unless the future statistics is exactly the same as the past statistics, those samples should be representative so it is relevant if properly updated. Through normalization (described below), the statistics may be used to map the intra-flow packet priority level of the packet to a WRED marking (e.g., a DiffServ marking), "M". By them marking the packet with "M" (WRED/DiffServ), the packet may be placed in the network queue of the corresponding interface 210.

Figure 5:
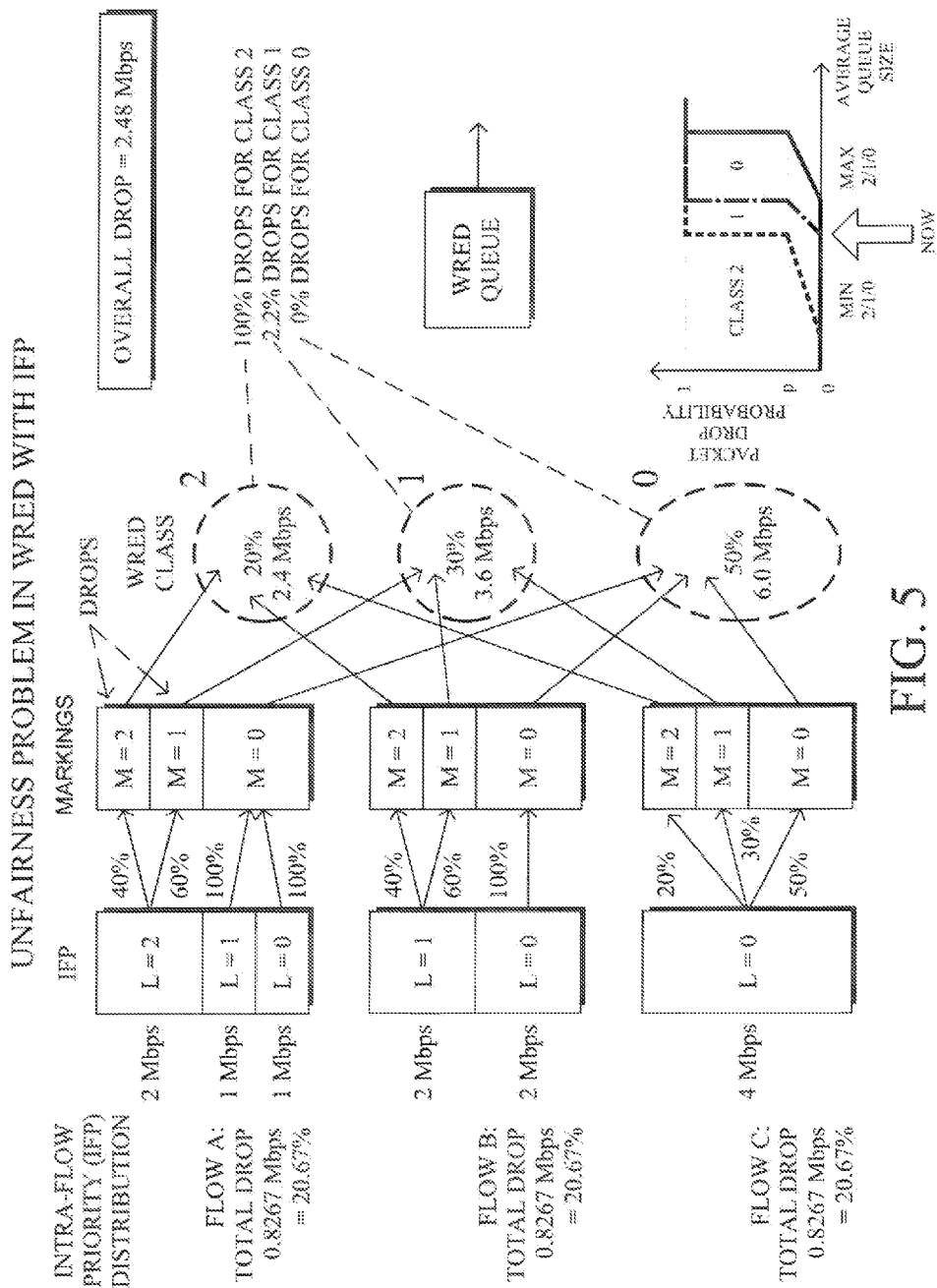
FIG. 5 illustrates an example of fairness by adaptive marking with IFP.

According to the techniques herein, therefore, FIG. 5 illustrates an example of fairness by adaptive marking with IFP. In particular, assuming the same intra-flow priority distribution as in FIG. 3 above between flows A, B, and C, and the same overall drop rate of 2.48 Mbps, the techniques herein can be shown to more fairly drop packets across all flows (e.g., 20.67% for each flow). For instance, based on the running statistics of intra-flow packet priority levels, the router may determine an appropriate mapping between the IFP and the WRED marking per-flow, such as the mappings shown between L and M for each flow in FIG. 5. From this mapping, 20% of the traffic is identified as WRED class 2 (M=2), 30% as class 1 (M=1), and 50% as class 0 (M=0). As such, for a 20.67% drop (2.48 Mbps), 100% of the class 2 (M=2) traffic is dropped, with only 2.2% for class 1 (M=1) and 0% for class 0 (M=0). As such, the "more important" traffic is generally forwarded, while "less important" traffic may be dropped, while at the same time ensuring fairness between the flows since each flow has a different proportion of more/less important traffic.

Figure 6:
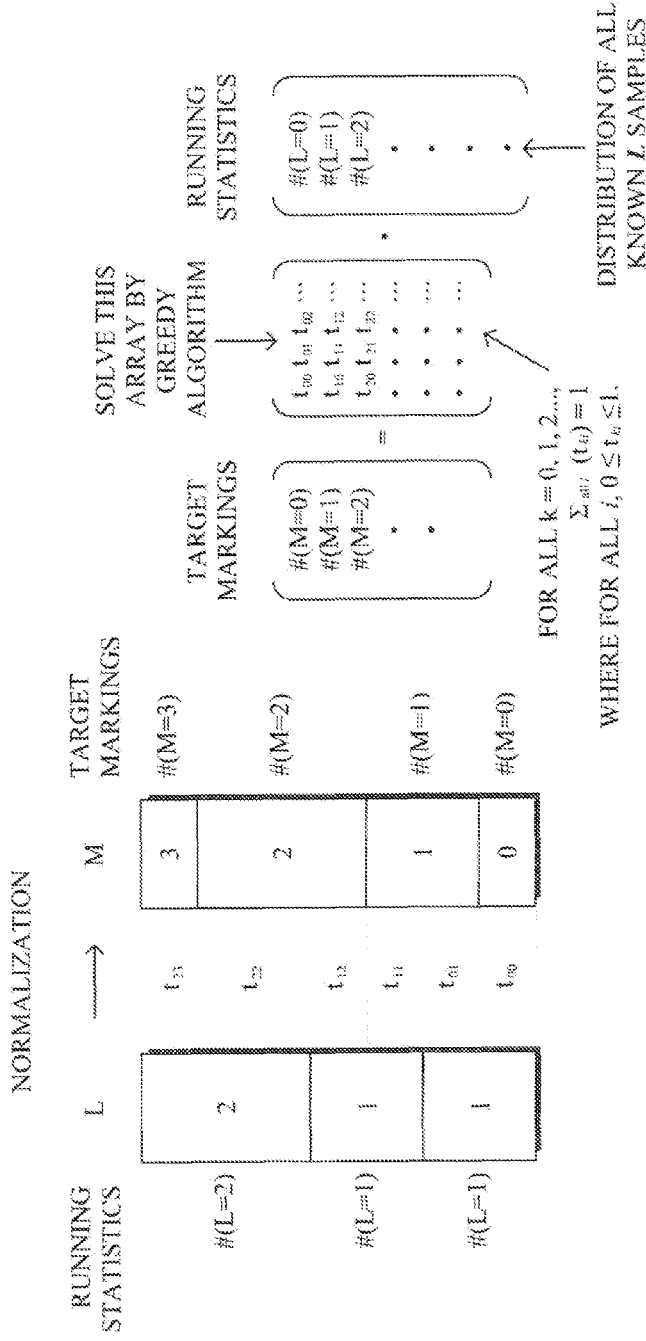
FIG. 6 illustrates an example of normalization in adaptive marking.

FIG. 6 illustrates an example of normalization in adaptive marking according to the techniques herein. In particular, based on the running statistics of L, through normalization these L values can be mapped to corresponding target markings M. A general mapping solution as shown may be ideal and could be done by solving a system of linear equations with optimization, such that each lower L is mapped to lower M as much as possible, i.e., a "greedy algorithm". For instance, given the target markings M (e.g., 0, 1, 2, etc.), a normalization array can be solved by a greedy algorithm and applied to the running statistics of L (i.e., the distribution of all known L samples). As an example, the normalization array may be solved where for all k=1, 2, . . . , $$\Sigma_{all\ i}(t_{ki})=1, \quad\quad\quad \text{Eq. 1}$$

where for all i, $0 \le t_{ki} \le 1$. Note that the complexity per flow of the techniques herein may be illustrated as follows:

Time is on the order of (#L+#M) to re/calculate the normalization array.
Space is on the order of (#L×#M) to store the normalization array.

To reduce the computation overhead, one may choose to recalculate the normalization array only periodically (e.g., every 10 seconds), instead of recalculating whenever the statistics is updated per packet arrival, or use some heuristic algorithm with much reduced complexity in time and space, just to achieve semi-fairness (e.g., where a heuristic algorithm may have reduced complexity so it may be preferred in some implementations if scalability is a concern in system performance).

Figure 7:
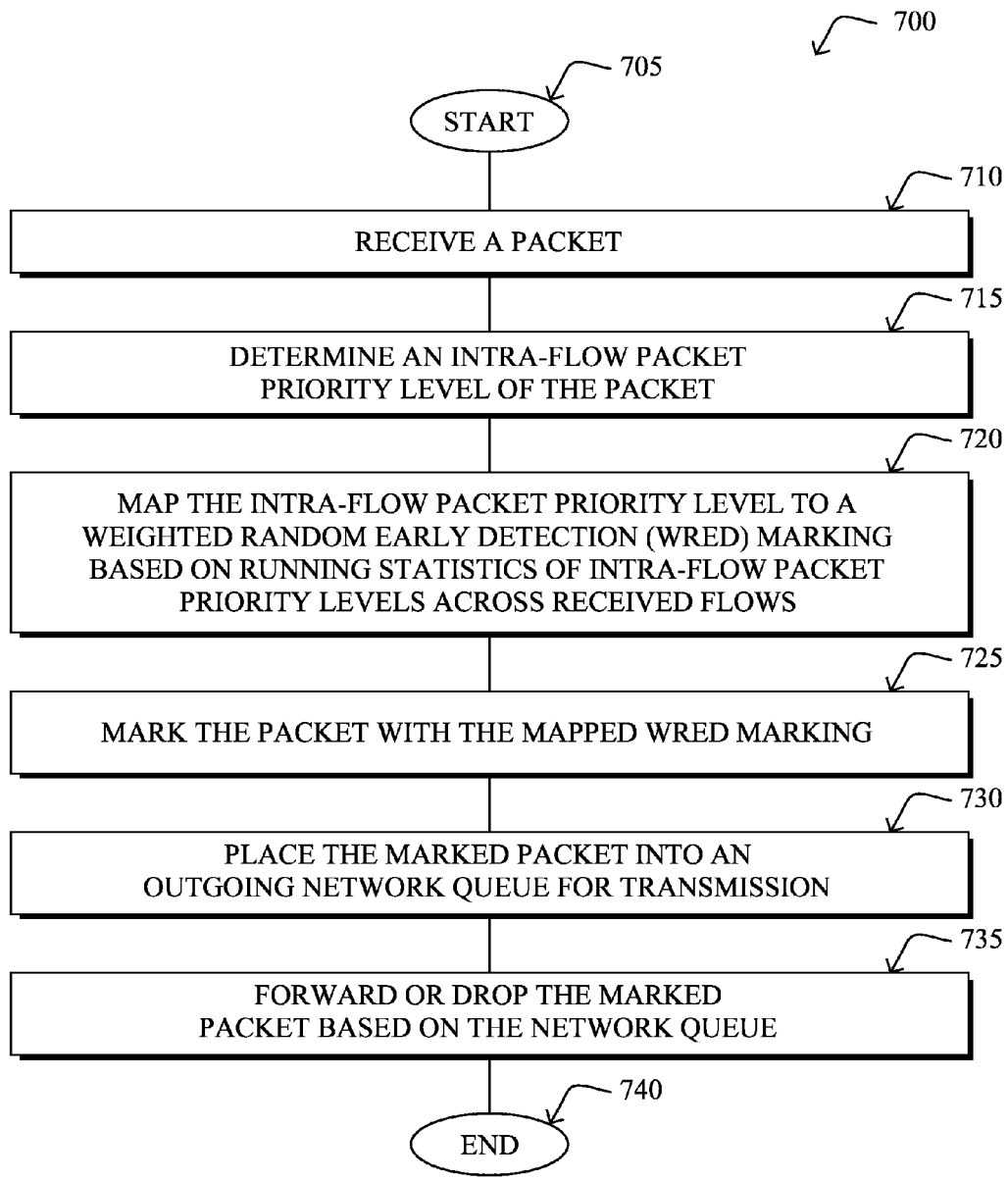
FIG. 7 illustrates an example simplified procedure for adaptive marking for WRED with intra-flow packet priorities in network queues.

FIG. 7 illustrates an example simplified procedure 700 for adaptive marking for WRED with intra-flow packet priorities in network queues in accordance with one or more embodiments described herein. The procedure 700 may start at step 705, and continues to step 710, where, as described in greater detail above, a router 120 may receive a packet 140, and determines an intra-flow packet priority level of the packet in step 715. Notably, as described above, the intra-flow packet priority level may be based on a packet type and/or a packet marking. For instance, where the packet is a video packet, the intra-flow packet priority level is based on whether the packet is an IDR packet, a sequence parameters packet, a referenced P packet, a non-referenced P packet, a non-referenced B packet, etc.

In step 720, the router maps the intra-flow packet priority level to a WRED marking based on running statistics of intra-flow packet priority levels across received flows, as described above. In particular, in one or more embodiments, the router normalizes the mapping of the intra-flow packet priority level to a WRED marking based on running statistics of intra-flow packet priority levels across received flows, e.g., mapping each lower intra-flow packet priority level to a lower WRED marking as much as possible. Note that the normalization may be recalculated periodically, per packet, or using a heuristic algorithm, as mentioned above.

In step 725, the router may then mark the packet with the mapped WRED marking (e.g., DiffServ marking), and places the marked packet into an outgoing network queue for transmission in step 730. Accordingly, in step 735, the router may either forward or drop the marked packet based on the network queue as described above, and the procedure 700 ends in step 740 until another packet is received.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for adaptive marking for WRED with intra-flow packet priorities in network queues. In particular, the techniques herein provide both fairness and better QoS (e.g., video QoS) against network congestion by classifying/marking "per-flow" and then queuing "per-class", and may be compliant with the existing ECN mechanism for endpoints. For instance, the techniques herein can protect the more important packets (e.g., video packets) in each flow, unless all the less important packets in the same flow are already dropped at congestion, so that the receiver (e.g., client device 110) may see better QoS and quality of experience (QoE) after decoding, while each flow sees fairness in terms of packet drop rates upon network congestion. For example, the techniques herein are able to prioritize video IDR-packets over other flows' packets that may mostly be P-packets instantaneously, while also offering a normalization mechanism for fairness.

While there have been shown and described illustrative embodiments that provide for adaptive marking for WRED with intra-flow packet priorities in network queues, it is to be understood that various other adaptations and modifications may be made within the spirit and scope of the embodiments herein. For example, the embodiments have been shown and described herein with specific relation to video flows. However, the embodiments in their broader sense are not as limited, and may, in fact, be used with other types of data flows with intra-flow priorities. In addition, while certain protocols are shown, such as UPD/RTP, other suitable protocols may be used, accordingly. Also, it should be noted that drop/mark precedence for video flows may be based on packet priority or picture importance, and not necessarily on picture type. In other words, some intra-pictures are more important pictures, and may be accounted for properly according to the techniques herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
receiving, at a network device, a packet;
determining, by the network device, an intra-flow packet priority level of the packet, wherein the intra-flow packet priority level is a priority of the packet within a particular flow in relation to other packets in the particular flow and intra-flow priority distribution is different across received flows at the network device;
mapping, by the network device, the intra-flow packet priority level to a weighted random early detection (WRED) marking based on running statistics of intra-flow packet priority levels across received flows;
marking, by the network device, the packet with the mapped WRED marking to normalize intra-flow priority markings for WRED in a manner that is adaptive to traffic characteristics of each received flow;
placing, by the network device, the marked packet into an outgoing network queue for transmission; and
forwarding or dropping the marked packet by the network device based on the network queue, wherein the received flows have equal per-flow packet drop rates and thresholds among packets in different flows, and each particular flow of the received flows has different packet drop rates and thresholds among packets inside each particular flows, respectively.

2. The method as in claim 1, further comprising:
normalizing the mapping of the intra-flow packet priority level to a WRED marking based on running statistics of intra-flow packet priority levels across received flows.

3. The method as in claim 2, further comprising:
recalculating normalization periodically.

4. The method as in claim 2, further comprising:
recalculating normalization per packet.

5. The method as in claim 2, further comprising:
recalculating normalization using a heuristic algorithm.

6. The method as in claim 2, further comprising:
mapping each lower intra-flow packet priority level to a lower WRED marking as much as possible.

7. The method as in claim 1, wherein the intra-flow packet priority level is based on at least one of a packet type or a packet marking.

8. The method as in claim 1, wherein the WRED marking is a Differentiated Services (DiffServ) marking.

9. The method as in claim 1, wherein the packet is a video packet.

10. The method as in claim 9, wherein the intra-flow packet priority level is based on whether the packet is an instantaneous decode refresh (IDR) packet, a sequence parameters packet, a referenced P packet, a non-referenced P packet, or a non-referenced B packet.

11. An apparatus, comprising:
one or more network interfaces to communicate within a computer network;
a processor coupled to the network interfaces and adapted to execute one or more processes; and
a memory configured to store a process executable by the processor, the process when executed operable to:
receive a packet;
determine an intra-flow packet priority level of the packet, wherein the intra-flow packet priority level is a priority of the packet within a particular flow in relation to other packets in the particular flow and intra-flow priority distribution is different across received flows;
map the intra-flow packet priority level to a weighted random early detection (WRED) marking based on running statistics of intra-flow packet priority levels across received flows;
mark the packet with the mapped WRED marking to normalize intra-flow priority markings for WRED in a manner that is adaptive to traffic characteristics of each received flow;
place the marked packet into an outgoing network queue for transmission; and
forward or drop the marked packet based on the network queue, wherein the received flows have equal per-flow packet drop rates and thresholds among packets in different flows, and each particular flow of the received flows has different packet drop rates and thresholds among packets inside each particular flows, respectively.

12. The apparatus as in claim 11, wherein the process when executed is further operable to:
normalize the mapping of the intra-flow packet priority level to a WRED marking based on running statistics of intra-flow packet priority levels across received flows.

13. The apparatus as in claim 12, wherein the process when executed is further operable to:
recalculate normalization either periodically, per packet, or using a heuristic algorithm.

14. The apparatus as in claim 12, wherein the process when executed is further operable to:
map each lower intra-flow packet priority level to a lower WRED marking as much as possible.

15. The apparatus as in claim 11, wherein the intra-flow packet priority level is based on at least one of a packet type or a packet marking.

16. The apparatus as in claim 11, wherein the WRED marking is a Differentiated Services (DiffServ) marking.

17. The apparatus as in claim 11, wherein the packet is a video packet.

18. One or more non-transitory computer-readable storage media encoded with software comprising computer executable instructions and when the software is executed operable to:
receive a packet;
determine an intra-flow packet priority level of the packet, wherein the intra-flow packet priority level is a priority of the packet within a particular flow in relation to other packets in the particular flow and intra-flow priority distribution is different across received flows;
map the intra-flow packet priority level to a weighted random early detection (WRED) marking based on running statistics of intra-flow packet priority levels across received flows;
mark the packet with the mapped WRED marking to normalize intra-flow priority markings for WRED in a manner that is adaptive to traffic characteristics of each received flow;
place the marked packet into an outgoing network queue for transmission; and
forward or drop the marked packet based on the network queue, wherein the received flows have equal per-flow packet drop rates and thresholds among packets in different flows, and each particular flow of the received flows has different packet drop rates and thresholds among packets inside each particular flows, respectively.

19. The computer-readable storage media as in claim 18, wherein the software when executed is further operable to:
normalize the mapping of the intra-flow packet priority level to a WRED marking based on running statistics of intra-flow packet priority levels across received flows.

20. The computer-readable storage media as in claim 18, wherein the intra-flow packet priority level is based on at least one of a packet type or a packet marking.

* * * * *